United States Patent
Araki

(10) Patent No.: US 10,351,475 B2
(45) Date of Patent: Jul. 16, 2019

(54) ASPHALT COMPOSITION

(71) Applicant: Asahi Kasei Kabushiki Kaisha, Tokyo (JP)

(72) Inventor: Yoshifumi Araki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 248 days.

(21) Appl. No.: 15/314,564

(22) PCT Filed: May 27, 2015

(86) PCT No.: PCT/JP2015/065224
§ 371 (c)(1),
(2) Date: Nov. 29, 2016

(87) PCT Pub. No.: WO2015/182649
PCT Pub. Date: Dec. 3, 2015

(65) Prior Publication Data
US 2017/0197879 A1    Jul. 13, 2017

(30) Foreign Application Priority Data
May 29, 2014   (JP) ................................ 2014-111763

(51) Int. Cl.
| | |
|---|---|
| C04B 26/04 | (2006.01) |
| C04B 26/14 | (2006.01) |
| C04B 26/26 | (2006.01) |
| E01C 7/18 | (2006.01) |
| C08L 53/02 | (2006.01) |
| C08L 95/00 | (2006.01) |
| C04B 103/00 | (2006.01) |
| C04B 111/00 | (2006.01) |

(52) U.S. Cl.
CPC ............ *C04B 26/045* (2013.01); *C04B 26/14* (2013.01); *C04B 26/26* (2013.01); *C08L 53/02* (2013.01); *C08L 95/00* (2013.01); *E01C 7/18* (2013.01); *C04B 2103/0061* (2013.01); *C04B 2111/0075* (2013.01); *E01C 7/182* (2013.01)

(58) Field of Classification Search
CPC ........ C08L 53/02; C08L 95/00; C04B 26/045; C04B 26/14; C04B 26/26; C04B 2103/0061; C04B 2111/0075; E01C 7/18; E01C 7/182; C08F 297/04; C08F 297/044; C08F 297/046; C08F 295/00; C08F 297/00
See application file for complete search history.

(56) References Cited

U.S. PATENT DOCUMENTS

| | | | |
|---|---|---|---|
| 5,036,119 A | 7/1991 | Berggren | |
| 6,150,439 A * | 11/2000 | Keiichi | .................... C08L 53/02 |
| | | | 524/59 |
| 2008/0114099 A1 | 5/2008 | Kluttz et al. | |
| 2008/0275183 A1 | 11/2008 | Kluttz et al. | |
| 2009/0131558 A1* | 5/2009 | Kim | ....................... C08F 297/04 |
| | | | 523/450 |
| 2011/0034594 A1 | 2/2011 | Scholten et al. | |
| 2011/0251347 A1* | 10/2011 | Graves | .................. C08F 297/04 |
| | | | 525/89 |

FOREIGN PATENT DOCUMENTS

| | | |
|---|---|---|
| CN | 1051048 A | 5/1991 |
| EP | 1464672 A1 | 10/2004 |
| EP | 1852446 A1 | 11/2007 |
| JP | H03-281651 A | 12/1991 |
| JP | H08-165435 A | 6/1996 |
| JP | H08-225711 A | 9/1996 |
| JP | H09-012898 A | 1/1997 |
| JP | 2001-064065 A | 3/2001 |
| JP | 2001-072862 A | 3/2001 |
| JP | 2002-332606 A | 11/2002 |
| JP | 2010-509469 A | 3/2010 |
| JP | 2010-526180 A | 7/2010 |
| JP | 2011-518244 A | 6/2011 |
| JP | 2012-116897 A | 6/2012 |

OTHER PUBLICATIONS

International Preliminary Report on Patentability and Written Opinion issued in corresponding International Patent Application No. PCT/JP2015/065224 dated Nov. 29, 2016.
European Search Report issued in corresponding European Patent Application No. 15798866.8 dated Jul. 3, 2017.
International Search Report issued in corresponding International Patent Application No. PCT/JP2015/065224 dated Aug. 18, 2015.

* cited by examiner

*Primary Examiner* — Irina S Zemel
*Assistant Examiner* — Jeffrey S Lenihan
(74) *Attorney, Agent, or Firm* — Morgan, Lewis & Bockius LLP

(57) ABSTRACT

The asphalt composition of the present invention is an asphalt composition comprising 1% to 15% by mass of a block copolymer (a) and an asphalt (c), wherein the block copolymer (a) comprises a specific block copolymer (a-1) and a specific block copolymer (a-2) in specific amounts, wherein the content of a vinyl aromatic monomer unit in the block copolymer (a) is 34% by mass or more and 55% by mass or less, the number average molecular weight of the block copolymer (a-1) is in the range of 20,000 to 73,000, and the number average molecular weight of the block copolymer (a-2) is 1.5 to 5.0 times higher than the number average molecular weight of the block copolymer (a-1).

20 Claims, No Drawings

ASPHALT COMPOSITION

TECHNICAL FIELD

The present invention relates to an asphalt composition.

BACKGROUND ART

Conventionally, an asphalt composition has been widely utilized for intended uses such as road pavement, a waterproof sheet, a soundproof sheet, and roofing. Upon the use of such an asphalt composition, many attempts have been made to add various polymers to the asphalt so as to improve the properties thereof. As such polymers, an ethylene-vinyl acetate copolymer, an ethylene-ethyl acrylate copolymer, rubber latex, a block copolymer consisting of conjugated diene and vinyl aromatic hydrocarbon, and the like have been used.

On the other hand, in recent years, from the viewpoint of cost reduction and the ease of paving, it has been increasingly desired to reduce a time required to produce an asphalt composition, to reduce the viscosity thereof, and the like.

In order to reduce the viscosity of an asphalt composition, a technique of allowing an asphalt composition to comprise various additives, so as to decrease a mixing temperature during the production thereof, has been known, for example, as described in Patent Documents 1 to 3.

For instance, a foaming agent has been added as an additive to such an asphalt composition, so that the production temperature has been decreased due to fine bubbles generated as a result of the addition of the foaming agent, or water has been added as an additive thereto, so that the asphalt has been liquefied. Otherwise, saturated fatty acid and phosphoric acid have been added, together with polybasic acid alcohol ester, to the asphalt composition, so that a decrease in the mixing temperature during the production has been studied.

LIST OF PRIOR ART DOCUMENTS

Patent Document

Patent Document 1: Japanese Patent Laid-Open No. 2001-072862
Patent Document 2: Japanese Patent Laid-Open No. 2002-332606
Patent Document 3: Japanese Patent Laid-Open No. 2001-064065

SUMMARY OF INVENTION

Problems to be Solved by Invention

However, even by applying the methods disclosed in Patent Documents 1 to 3, satisfactory results have not yet been obtained, and thus, it has been desired to further improve the achievement of a low temperature upon the production of an asphalt composition. Moreover, it has been found that the aforementioned technique of decreasing the mixing temperature upon the production of an asphalt composition is problematic in that it is difficult to control fine bubbles, in that the stripping resistance of an aggregate is deteriorated by adding an additive in an amount necessary for a decrease in the mixing temperature, upon the production of a mixture of an asphalt composition and the aggregate, and in that thermal degradation would occur depending on the type of an additive.

It is an object of the present invention to provide an asphalt composition having a low mixing temperature upon the production thereof, and a low viscosity. It is another object of the present invention to provide an asphalt composition comprising a polymer having a low level of degradation, wherein an aggregate has high stripping resistance when the asphalt composition is mixed with the aggregate.

Means for Solving Problems

As a result of intensive studies directed towards achieving the aforementioned objects, the present inventors have found that, by using a polymer having a specific molecular structure, an asphalt composition having a low mixing temperature upon the production thereof and a low viscosity can be obtained, and further that degradation, of the polymer comprised in the asphalt composition hardly occurs, and an aggregate is capable of maintaining high stripping resistance, when an asphalt composition is mixed with the aggregate, thereby completing the present invention.

Specifically, the present invention is as follows.

[1]

An asphalt composition comprising 1% to 15% by mass of a block copolymer (a) and an asphalt (c), wherein the block copolymer (a) comprises a block copolymer (a-1) and a block copolymer (a-2), wherein the block copolymer (a-1) has a polymer block comprising, as a main component, a vinyl aromatic monomer unit, and a polymer block comprising, as a main component, a conjugated diene monomer unit, and the block copolymer (a-2) has a polymer block comprising, as a main component, a vinyl aromatic monomer unit, and a polymer block comprising, as a main component, a conjugated diene monomer unit, a content of the block copolymer (a-1) in the total mass of the block copolymer (a) is 40% by mass or more and 85% by mass or less, a content of the block copolymer (a-2) in the total mass of the block copolymer (a) is 15% by mass or more and 60% by mass or less, a content of the vinyl aromatic monomer unit in the block copolymer (a) is 34% by mass or more and 55% by mass or less, a number average molecular weight of the block copolymer (a-1) is in the range of 20,000 to 73,000, and a number average molecular weight of the block copolymer (a-2) is 1.5 to 5.0 times higher than the number average molecular weight of the block copolymer (a-1).

[2]

The asphalt composition according to [1], wherein the block copolymer (a-1) has one polymer block comprising, as a main component, a vinyl aromatic monomer unit, and one polymer block comprising, as a main component, a conjugated diene monomer unit, and the block copolymer (a-2) has two or more polymer blocks each comprising, as a main component, a vinyl aromatic monomer unit, and one or more polymer blocks each comprising, as a main component, a conjugated diene monomer unit.

[3]

The asphalt composition according to [1] or [2], wherein the block copolymer (a-2) comprises at least one block copolymer selected from the group consisting of (S-B)n+1, B-(S-B)n+1, S-(B-S)n, S-(B-S)n-X, [(S-B)k]m-X, and [(S-B)k-S]m-X (wherein, in each formula, m represents an integer of 2 to 6; n and k each independently represent an integer of 1 to 4; S represents a polymer block comprising, as a main component, a vinyl aromatic monomer unit; B represents a polymer block comprising, as a main component, a conjugated diene monomer unit; and X represents a residue of a coupling agent or a residue of a polymerization initiator).

[4]

The asphalt composition according to any one of [1] to [3], wherein the block copolymer (a-2) comprises at least a block copolymer represented by (S-B)3-X (wherein S represents a polymer block comprising, as a main component, a vinyl aromatic monomer unit; B represents a polymer block comprising, as a main component, a conjugated diene monomer unit; and X represents a residue of a coupling agent).

[5]

The asphalt composition according to any one of [1] to [4], wherein the content of the block copolymer (a-1) in the block copolymer (a) is 55% by mass or more and 85% by mass or less.

[6]

The asphalt composition according to any one of [1] to [5], wherein a ratio of the content of a vinyl aromatic monomer block to the total content of the vinyl aromatic monomer unit in the block copolymer (a) is in the range of 90.0% to 99.0% by mass.

[7]

The asphalt composition according to any one of [1] to [6], which further comprises 0.5% to 10% by mass of a block copolymer (b), wherein the block copolymer (b) has a polymer block comprising, as a main component, a vinyl aromatic monomer unit, and a polymer block comprising, as a main component, a conjugated diene monomer unit, and a content of the vinyl aromatic monomer unit in the block copolymer (b) is 24% by mass or more and less than 34% by mass.

[8]

The asphalt composition according to [7], wherein the block copolymer (b) comprises a block copolymer (b-1) and a block copolymer (b-2), wherein the block copolymer (b-1) has a polymer block comprising, as a main component, a vinyl aromatic monomer unit, and a polymer block comprising, as a main component, a conjugated diene monomer unit, and the block copolymer (b-2) has a polymer block comprising, as a main component, a vinyl aromatic monomer unit, and a polymer block comprising, as a main component, a conjugated diene monomer unit, a content of the block copolymer (b-1) in the total mass of the block copolymer (b) is 5% by mass or more and 40% by mass or less, a content of the block copolymer (b-2) in the total mass of the block copolymer (b) is 60% by mass or more and 95% by mass or less, a number average molecular weight of the block copolymer (b-1) is in the range of 60,000 to 150,000, and a number average molecular weight of the block copolymer (b-2) is 1.5 to 5.0 times higher than the number average molecular weight of the block copolymer (b-1).

[9]

The asphalt composition according to [8], wherein the block copolymer (b-1) has one polymer block comprising, as a main component, a vinyl aromatic monomer unit, and one polymer block comprising, as a main component, a conjugated diene monomer unit, and the block copolymer (b-2) has two or more polymer blocks each comprising, as a main component, a vinyl aromatic monomer unit, and one or more polymer blocks each comprising, as a main component, a conjugated diene monomer unit.

[10]

The asphalt composition according to any one of [1] to [9], wherein the block copolymer (a) and/or the block copolymer (b) are block copolymers, in which double bonds in the conjugated diene monomer unit are hydrogenated.

[11]

A road comprising the asphalt composition according to any one of [1] to [10] and an aggregate.

Advantages of Invention

The asphalt composition of the present invention has a low mixing temperature upon the production thereof and a low viscosity, and also, degradation, of the polymer comprised in the asphalt composition hardly occurs, and an aggregate is capable of maintaining high stripping resistance, when an asphalt composition is mixed with the aggregate.

MODE FOR CARRYING OUT INVENTION

Hereafter, the mode for carrying out the present invention (hereinafter referred to as "the present embodiment") will be described in detail. The present invention is not limited to the present embodiments as described below, but it can be carried out by being modified in various ways, in the scope of the gist thereof.

<<Asphalt Composition>>

The asphalt composition of the present embodiment is an asphalt composition comprising 1% to 15% by mass of a block copolymer (a) and an asphalt (c), wherein the block copolymer (a) comprises a block copolymer (a-1) and a block copolymer (a-2), wherein the block copolymer (a-1) has a polymer block comprising, as a main component, a vinyl aromatic monomer unit, and a polymer block comprising, as a main component, a conjugated diene monomer unit, and the block copolymer (a-2) has a polymer block comprising, as a main component, a vinyl aromatic monomer unit, and a polymer block comprising, as a main component, a conjugated diene monomer unit, the content of the block copolymer (a-1) in the total mass of the block copolymer (a) is 40% by mass or more and 85% by mass or less, the content of the block copolymer (a-2) in the total mass of the block copolymer (a) is 15% by mass or more and 60% by mass or less, the content of the vinyl aromatic monomer unit in the block copolymer (a) is 34% by mass or more and 55% by mass or less, the number average molecular weight of the block copolymer (a-1) is in the range of 20,000 to 73,000, and the number average molecular weight of the block copolymer (a-2) is 1.5 to 5.0 times higher than the number average molecular weight of the block copolymer (a-1).

Herein, a constitutional unit constituting a block copolymer is referred to as " . . . monomer unit," and when it is described as a material for polymers, the term "unit" is omitted, and it is simply referred to as " . . . monomer."

In addition, in the present description, the phrase "comprise as a main component" is used to mean that the content of a certain monomer unit in a block is preferably 60% by mass or more, more preferably 80% by mass or more, further preferably 90% by mass or more, and still further preferably 95% by mass or more. The upper limit is not particularly limited, and it is preferably 100% by mass or less, and more preferably 99% by mass or less.

[Structure of Polymer]

In the present embodiment, the block copolymer (a) comprises a block copolymer (a-1) and a block copolymer (a-2). The block copolymer (a-1) has a polymer block comprising, as a main component, a vinyl aromatic monomer unit, and a polymer block comprising, as a main component, a conjugated diene monomer unit, and block copolymer (a-2) has a polymer block comprising, as a main component, a vinyl aromatic monomer unit, and a polymer block comprising, as a main component, a conjugated diene monomer unit, and the number average molecular weight of the block copolymer (a-2) is 1.5 to 5.0 times higher than the number average molecular weight of the block copolymer (a-1).

The block copolymer (a-1) preferably has one polymer block comprising, as a main component, a vinyl aromatic monomer unit, and one polymer block comprising, as a main component, a conjugated diene monomer unit, whereas the block copolymer (a-2) preferably has two or more polymer blocks each comprising, as a main component, a vinyl aromatic monomer unit, and one or more polymer blocks each comprising, as a main component, a conjugated diene monomer unit.

The block copolymer (a-1) preferably comprises S-B and at least one block copolymer selected from the group consisting of the following formulae (i) to (iii), whereas the block copolymer (a-2) preferably comprises at least one block copolymer selected from the group consisting of the following formulae (i) to (vi).

(S-B)$n$+1  (i)

B-(S-B)$n$+1  (ii)

S-(B-S)$n$  (iii)

S-(B-S)$n$-X  (iv)

[(S-B)$k$]$m$-X  (v)

[(S-B)$k$-S]$m$-X  (vi)

In the above formulae (i) to (vi), S represents a polymer block comprising, as a main component, a vinyl aromatic monomer unit; B represents a polymer block comprising, as a main component, a conjugated diene monomer unit; X represents a residue of a coupling agent, or a residue of a polymerization initiator such as multifunctional organic lithium; m represents an integer of 2 to 6; and n and k each independently represent an integer of 1 to 4. The m, n and k values in the formulae (i) to (vi) may be identical to or different from one another.

When a plurality of blocks S and B are present in a block copolymer, the structures of individual blocks, such as molecular weight and composition, may be identical to or different from one another.

In the above formulae (iv) to (vi), X represents a residue of a coupling agent, or a residue of a polymerization initiator such as multifunctional organic lithium. From the viewpoint of the control of the molecular weight of a block, X is preferably a residue of a coupling agent.

The coupling agent is not particularly limited. Examples of the coupling agent include silicon tetrachloride, tin tetrachloride, an epoxy compound, a polyhalogenated hydrocarbon compound, a carboxylic acid ester compound, a polyvinyl compound, an alkoxysilane compound, a halogenated silane compound, and an ester-based compound. The block copolymer (a-2) may be a mixture of a coupling body, in which X is a residue of a coupling agent, and a block copolymer that does not have X.

From the viewpoint of the thermal degradation resistance of a block copolymer upon the production of an asphalt composition, X is preferably an alkoxysilane compound or an epoxy compound, and more preferably an epoxy compound.

The example of alkoxysilane compound is not particularly limited, and examples of the alkoxysilane compound include: tetraalkoxysilane compounds, such as tetramethoxysilane and compounds of the same type; tetraaryloxysilane compounds, such as tetraphenoxysilane and compounds of the same type; alkylalkoxysilane compounds having two or three or more alkoxy groups, such as methyltriethoxysilane and compounds of the same type; alkylaryloxysilane compounds having two or three or more aryloxy groups, such as methyltriphenoxysilane and compounds of the same type; alkenylalkoxysilane compounds having two or three or more alkoxy groups, such as vinyltrimethoxysilane and compounds of the same type; and halogenoalkoxysilane compounds, such as trimethoxychlorosilane and compounds of the same type. Among these compounds, from the viewpoint of thermal degradation resistance and the manufacturability of block copolymers, alkylalkoxysilane having 2 to 4 alkylalkoxy groups is preferable.

The example of the epoxy compound is not particularly limited, and examples of the epoxy compound include polyepoxidized vegetable oil such as epoxidized soybean oil or epoxidized linseed oil, epoxidized polybutadiene, and epoxidized tetraallyl ether pentaerythritol. Among these compounds, from the viewpoint of thermal degradation resistance and the manufacturability of block copolymers, an epoxy compound having a phenyl group is preferable.

From the viewpoint of a low mixing temperature for an asphalt composition, the low viscosity of the asphalt composition, low levels of degradation of polymers in the asphalt composition, and the high stripping resistance of an aggregate when a mixture is formed from the asphalt composition and the aggregate, the number of alkoxysilyl groups or epoxy groups in the alkoxysilane compound or the epoxy compound is preferably 2 to 5, more preferably 2 to 4, further preferably 3 or 4, and particularly preferably 4, per molecule.

It is to be noted that the boundary between individual blocks or the endmost thereof is not necessarily clearly distinguished. For example, there may be a copolymer block consisting of a vinyl aromatic monomer unit and a conjugated diene monomer unit. Moreover, a plurality of these copolymer blocks may also coexist. In a polymer block (S) comprising, as a main component, a vinyl aromatic monomer unit, a plurality of segments each having a different content of the vinyl aromatic monomer unit may coexist.

A different type of short block may be present at the end of each block, if it has 40% or less of the molecular weight of the block.

From the viewpoint of a low mixing temperature applied during the production of an asphalt composition, the low viscosity of the asphalt composition, low levels of degradation of polymers in the asphalt composition, and the high stripping resistance of an aggregate when a mixture is formed from the asphalt composition and the aggregate, the block copolymer (a-2) used in the present embodiment preferably comprises at least one block copolymer selected from the group consisting of (S-B)$m$-X (wherein m represents an integer of 2 to 4; S represents a polymer block comprising, as a main component, a vinyl aromatic monomer unit; B represents a polymer block comprising, as a main component, a conjugated diene monomer unit; and X represents a residue of a coupling agent or a residue of a polymerization initiator), and more preferably comprises a block copolymer represented by (S-B)3-X (wherein S represents a polymer block comprising, as a main component, a vinyl aromatic monomer unit; B represents a polymer block comprising, as a main component, a conjugated diene monomer unit; and X represents a residue of a coupling agent). The block copolymer (a-2) further preferably comprises (S-B)3-X and (S-B)4-X, and in this case, the ratio of the (S-B)3-X in the total mass of the block copolymer (a) is preferably 30% by mass or more and 80% by mass or less, and more preferably 40% by mass or more and 70% by mass or less. In addition, among (S-B)2-X, (S-B)3-X and (S-B)4-X wherein m=2 to 4, it is more preferable that the content of (S-B)2-X be lowest.

From the viewpoint of a low mixing temperature for an asphalt composition, the low viscosity of the asphalt composition, and low levels of degradation of polymers in the asphalt composition, the ratio of the block copolymer (a-1) used in the present embodiment in the total mass of the block copolymer (a) is 40% by mass or more, preferably 55% by mass or more, more preferably 62% by mass or more, and further preferably 67% by mass or more. Moreover, from the viewpoint of the high elongation recovery of the asphalt composition and the high stripping resistance of an aggregate when a mixture is formed from the asphalt composition and the aggregate, the ratio of the block copolymer (a-1) is 85% by mass or less, preferably 80% by mass or less, more preferably 75% by mass or less, and further preferably 72% by mass or more.

Furthermore, from the viewpoint of the high elongation recovery of an asphalt composition and the high stripping resistance of an aggregate when a mixture is formed from the asphalt composition and the aggregate, the ratio of the block copolymer (a-2) used in the present embodiment in the total mass of the block copolymer (a) is 15% by mass or more, preferably 20% by mass or more, more preferably 25% by mass or more, and further preferably 28% by mass or more. Further, from the viewpoint of a low mixing temperature for an asphalt composition, the low viscosity of the asphalt composition, and low levels of degradation of polymers in the asphalt composition, the ratio of the block copolymer (a-2) is 60% by mass or less, preferably 45% by mass or less, more preferably 38% by mass or less, and further preferably 33% by mass or less.

From the viewpoint of the high softening point of an asphalt composition and the high stripping resistance of an aggregate when a mixture is formed from the asphalt composition and the aggregate, the number average molecular weight of the block copolymer (a-1) used in the present embodiment is 20,000 or more, preferably 30,000 or more, and more preferably 40,000 or more. Moreover, from the viewpoint of a low mixing temperature for an asphalt composition, the low viscosity of the asphalt composition, and low levels of degradation of polymers in the asphalt composition, the number average molecular weight of the present block copolymer (a-1) is 73,000 or less, preferably 67,000 or less, more preferably 60,000 or less, and further preferably 50,000 or less.

From the viewpoint of the high softening point of an asphalt composition and the high stripping resistance of an aggregate when a mixture is formed from the asphalt composition and the aggregate, the number average molecular weight of the block copolymer (a-2) used in the present embodiment is 1.5 to 5.0 times, preferably 1.7 to 4.0 times, and more preferably 1.8 to 3.0 times higher than the number average molecular weight of the block copolymer (a-1).

Furthermore, from the viewpoint of the high softening point or high tensile recovery of an asphalt composition, and the high stripping resistance of an aggregate when a mixture is formed from the asphalt composition and the aggregate, when the block copolymer (a-2) is (S-B)m-X, the number average molecular weight of the (S-B)m-X is preferably m times higher than the number average molecular weight of the block copolymer (a-1) represented by S-B or S-B-X.

It is to be noted that, in the present embodiment, the number average molecular weight of a polymer can be obtained by the method described in the below-mentioned Examples.

From the viewpoint of the high softening point of an asphalt composition and the high stripping resistance of an aggregate when a mixture is formed from the asphalt composition and the aggregate, the content of the vinyl aromatic monomer unit in the block copolymer (a) used in the present embodiment is 34% by mass or more, preferably 35% by mass or more, more preferably 40% by mass or more, and further preferably 42% by mass or more. On the other hand, from the viewpoint of a low mixing temperature applied during the production of an asphalt composition, the low viscosity of the asphalt composition, low levels of degradation of polymers in the asphalt composition, and the flexibility of the asphalt composition, the content of the vinyl aromatic monomer unit in the block copolymer (a) is 55% by mass or less, preferably 50% by mass or less, more preferably 48% by mass or less, further preferably 45% by mass or less, and particularly preferably 44% by mass or less.

Herein, the content of the vinyl aromatic monomer unit in the block copolymer (a) does not mean the value in each component, but it means the content of the vinyl aromatic monomer unit in the block copolymer (a) as a whole, namely, a mean value of the contents of the vinyl aromatic monomer units in individual components.

It is to be noted that, in the present embodiment, the content of the vinyl aromatic monomer unit in the block copolymer (a) can be measured by the method described in the below-mentioned Examples.

From the viewpoint of the high softening point of an asphalt composition, the high elongation recovery of the asphalt composition, and the high stripping resistance of an aggregate when an asphalt mixture is formed, the ratio of the content of the vinyl aromatic monomer block to the total content of the vinyl aromatic monomer unit in the block copolymer (a) used in the present embodiment (block percentage) is preferably 90% or more, more preferably 93% or more, further preferably 95% or more, and particularly preferably 96% or more.

Moreover, from the viewpoint of a low mixing temperature for an asphalt composition, the low viscosity of the asphalt composition, low levels of degradation of polymers in the asphalt composition, and the flexibility of the asphalt composition, the block percentage is preferably 99% or less, and more preferably 98% or less.

The ratio of the content of the vinyl aromatic monomer block to the total content of the vinyl aromatic monomer unit in the block copolymer (a) (block percentage) can be obtained by the following formula:

(Content of vinyl aromatic monomer block in block copolymer (a)/(total content of vinyl aromatic monomer unit in block copolymer (a))×100.

Herein, the vinyl aromatic monomer block means a polymer block comprising, as a main component, a vinyl aromatic monomer unit.

It is to be noted that, in the present embodiment, the content of the vinyl aromatic monomer block in the block copolymer (a) and the total content of the vinyl aromatic monomer unit in the block copolymer (a) are values obtained by the methods described in the below-mentioned Examples.

The ratio of the content of the vinyl aromatic monomer block to the total content of the vinyl aromatic monomer unit in the block copolymer (a) can be changed, for example, by a molecular weight, a polymerization temperature, the speed of adding monomers, the time interval between the previous addition of a monomer and the subsequent addition of a monomer, a polar compound or a randomizing agent, the stirring rate of a polymerization reactor, etc.

Specifically, for example, 1 minute or more and less than 21 minutes after when the temperature has reached a peak temperature appearing at the time of termination of the polymerization of the vinyl aromatic monomer unit, and also after the temperature is decreased by 1° C. or less from the peak temperature, a conjugated diene monomer unit is added, so that the above described block percentage can be set at 90% or more and 99% or less.

Herein, the ratio of the content of the vinyl aromatic monomer block to the total content of the vinyl aromatic monomer unit in the block copolymer (a) does not mean the value in each component, but it means a value in the block copolymer (a) as a whole, namely, a mean value of the contents of the vinyl aromatic monomer blocks in individual components.

From the viewpoint of manufacturability, the melt flow rate (MFR, 200° C., 5 kgf) of the block copolymer (a) used in the present embodiment is preferably 3 g/10 minutes or more, more preferably 5 g/10 minutes or more, and further preferably 10 g/10 minutes or more. Moreover, from the viewpoint of a low amount of polymer added to the asphalt and recovery after tension, the melt flow rate (MFR, 200° C., 5 kgf) of the block copolymer (a) is preferably 100 g/10 minutes or less, more preferably 50 g/10 minutes or less, and further preferably 30 g/10 minutes or less.

From the viewpoint of a low mixing temperature applied during the production of an asphalt composition, low viscosity, high tensile recovery, low levels of degradation of polymers in the asphalt composition, and the high stripping resistance of an aggregate when a mixture is formed from the asphalt composition and the aggregate, the asphalt composition of the present embodiment preferably further comprises 0.5% to 10% by mass of a block copolymer (b).

The block copolymer (b) has a polymer block comprising, as a main component, a vinyl aromatic monomer unit, and a polymer block comprising, as a main component, a conjugated diene monomer unit, and the content of the vinyl aromatic monomer unit in the block copolymer (b) is 24% by mass or more and less than 34% by mass.

From the viewpoint of a low mixing temperature applied during the production of an asphalt composition, the low viscosity of the asphalt composition, the high elongation of the asphalt composition, and low levels of degradation of polymers in the asphalt composition, the block copolymer (b) preferably comprises a block copolymer (b-1) and a block copolymer (b-2), which will be described below, and at this time, the block copolymer (b-1) has a polymer block comprising, as a main component, a vinyl aromatic monomer unit, and a polymer block comprising, as a main component, a conjugated diene monomer unit; the block copolymer (b-2) has a polymer block comprising, as a main component, a vinyl aromatic monomer unit, and a polymer block comprising, as a main component, a conjugated diene monomer unit; and the number average molecular weight of the block copolymer (b-2) is 1.5 to 5.0 times higher than the number average molecular weight of the block copolymer (b-1).

The block copolymer (b-1) preferably has one polymer block comprising, as a main component, a vinyl aromatic monomer unit, and one polymer block comprising, as a main component, a conjugated diene monomer unit, whereas the block copolymer (b-2) preferably has two or more polymer blocks each comprising, as a main component, a vinyl aromatic monomer unit, and one or more polymer blocks each comprising, as a main component, a conjugated diene monomer unit.

Examples of the structure of the block copolymer (b-1) include S-B and the structures of the formulae (i) to (iii), as in the case of the aforementioned block copolymer (a-1).

Examples of the structure of the block copolymer (b-2) include the structures of the formulae (i) to (vi), as in the case of the aforementioned block copolymer (a-2).

From the viewpoint of the high softening point of an asphalt composition, the tensile recovery of the asphalt composition, and the high stripping resistance of an aggregate when a mixture is formed from the asphalt composition and the aggregate, it is preferable that the block copolymer (b) and the block copolymer (b-2) each comprise a block copolymer represented by S-B-S or (S-B)2-X.

When the block copolymer (b) comprises the block copolymer (b-1) and the block copolymer (b-2), the content of the block copolymer (b-1) in the total mass of the block copolymer (b) is preferably 40% by mass or less, more preferably 35% by mass or less, further preferably 30% by mass or less, and particularly preferably 20% by mass or less. The lower limit of the content of the block copolymer (b-1) is not particularly limited, and it is preferably 5% by mass or more, more preferably 10% by mass or more, and further preferably 15% by mass or more.

Moreover, the content of the block copolymer (b-2) in the total mass of the block copolymer (b) is preferably 95% by mass or less, more preferably 90% by mass or less, and further preferably 85% by mass or less. The lower limit of the content of the block copolymer (b-2) is not particularly limited, and it is preferably 60% by mass or more, more preferably 65% by mass or more, even more preferably 70% by mass or more, and further preferably 80% by mass or more.

The block copolymer (b) is more preferably a mixture of (S-B)2-X (block copolymer (b-2)) and S-B (block copolymer (b-1)). Furthermore, from the viewpoint of a high softening point and the stripping resistance of an aggregate when a mixture is formed from the asphalt composition and the aggregate, the number average molecular weight of the block copolymer (b-1) is 60,000 or more, preferably 70,000 or more, and more preferably 80,000 or more. Further, from the viewpoint of a low mixing temperature applied during the production of an asphalt composition and low viscosity, the number average molecular weight of the block copolymer (b-1) is 150,000 or less, preferably 130,000 or less, more preferably 110,000, and further preferably 100,000 or less.

Moreover, the number average molecular weight of the block copolymer (b-1) is preferably the number average molecular weight of the block copolymer (a-1), or greater.

From the viewpoint of a low mixing temperature applied during the production of an asphalt composition, low viscosity, and the high stripping resistance of an aggregate when a mixture is formed from the asphalt composition and the aggregate, the number average molecular weight of the block copolymer (b-2) used in the present embodiment is 1.5 to 5.0 times, preferably 1.7 to 4.0 times, and more preferably 1.8 to 3.0 times higher than the number average molecular weight of the block copolymer (b-1).

From the viewpoint of the high softening point of an asphalt composition, the high tensile recovery of the asphalt composition, and the high stripping resistance of an aggregate when a mixture is formed from the asphalt composition and the aggregate, with regard to the mass ratio between the block copolymer (a) and the block copolymer (b), the mass of the block copolymer (a)/the mass of the block copolymer (b) is preferably 70/30 or less, more preferably 60/40 or less, and further preferably 50/50 or less. In addition, from the viewpoint of a low mixing temperature for an asphalt composition and the low viscosity of the asphalt composition, the mass of the block copolymer (a)/the mass of the block copolymer (b) is preferably 20/80 or more, more preferably 30/70 or more, and further preferably 40/60 or more.

From the viewpoint of the high softening point of an asphalt composition and the high thermal degradation resistance of polymers, with regard to the block polymer (a) and/or the block copolymer (b) used in the present embodiment, double bonds contained in the conjugated diene monomer unit in the polymer are preferably hydrogenated. From the viewpoint of the high softening point of an asphalt composition and high thermal degradation resistance during storage, the hydrogenation percentage of the double bonds contained in the conjugated diene monomer unit is preferably 10 mol % or more, more preferably 20 mol % or more, and further preferably 30 mol % or more. However, the hydrogenation percentage of the double bond amount contained in the conjugated diene monomer unit is preferably 75 mol % or less, from the viewpoint of high compatibility with the asphalt.

From the viewpoint of a higher softening point, at least the block polymer (a) is preferably hydrogenated, and both the block polymers (a) and (b) are more preferably hydrogenated.

It is to be noted that, in the present description, the conjugated diene monomer unit is referred to as a "conjugated diene monomer unit," regardless of before or after hydrogenation.

The hydrogenation percentage of the double bond amount can be regulated by controlling a hydrogenation amount and a hydrogenation reaction time in a hydrogenation step. Moreover, in the present embodiment, the hydrogenation percentage can be obtained by the method described in the below-mentioned Examples.

From the viewpoint of high compatibility with the asphalt and the low viscosity of an asphalt composition, the content of vinyl in the conjugated diene monomer unit in the block polymer (a) and the block copolymer (b) used in the present embodiment, before hydrogenation, is preferably 8 mol % or more, more preferably 10 mol % or more, and further preferably 12 mol % or more. Moreover, from the viewpoint of low levels of degradation of polymers in the asphalt composition, the vinyl content in the conjugated diene monomer unit in the block polymer (a) and the block copolymer (b), before hydrogenation, is preferably 25 mol % or less, more preferably 20 mol % or less, and further preferably 16 mol % or less.

[Method for Producing Polymer]

The polymer used in the present embodiment can be produced by successively performing the following steps: a polymerization step of polymerizing at least a conjugated diene monomer and a vinyl aromatic monomer in a hydrocarbon solvent to obtain a polymer, using a lithium compound as a polymerization initiator; a hydrogenation step of hydrogenating double bonds in the conjugated diene monomer unit in the obtained polymer; and a desolventizing step of removing a solvent from a solution comprising the polymer.

(Polymerization Step)

In the polymerization step, at least a conjugated diene monomer is polymerized with a monomer comprising a vinyl aromatic monomer in a hydrocarbon solvent, using a lithium compound as a polymerization initiator, so as to obtain a polymer.

(Hydrocarbon Solvent)

The hydrocarbon solvent used in the polymerization step is not particularly limited. Examples of the hydrocarbon solvent include: aliphatic hydrocarbons such as butane, pentane, hexane, isopentane, heptane, or octane; alicyclic hydrocarbons such as cyclopentane, methylcyclopentane, cyclohexane, methylcyclohexane, or ethylcyclohexane; and aromatic hydrocarbons such as benzene, toluene, ethylbenzene, or xylene. These solvents may be used singly, or in combination of two or more types.

(Polymerization Initiator)

The lithium compound used as a polymerization initiator in the polymerization step is not particularly limited. Examples of the lithium compound include compounds in which one or more lithium atoms bind into a molecule thereof, such as an organic monolithium compound, an organic dilithium compound, and an organic polylithium compound. Such an organic lithium compound is not particularly limited. Examples of the organic lithium compound include ethyl lithium, n-propyl lithium, isopropyl lithium, n-butyl lithium, sec-butyl lithium, tert-butyl lithium, hexamethylene dilithium, butadienyl dilithium, and isoprenyl dilithium. These organic lithium compounds may be used singly, or in combination of two or more types.

(Monomer Used in Polymerization)

The conjugated diene monomer is not particularly limited. Examples of the conjugated diene monomer include diolefins having a pair of conjugated double bonds, such as 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Among these, 1,3-butadiene and isoprene are preferable from the viewpoint of economic efficiency. In addition, from the viewpoint of mechanical strength, 1,3-butadiene is more preferable. These conjugated diene monomers may be used singly, or in combination of two or more types.

The vinyl aromatic monomer is not particularly limited. Examples of the vinyl aromatic monomer include vinyl aromatic compounds such as styrene, α-methylstyrene, p-methylstyrene, divinylbenzene, 1,1-diphenylethylene, N,N-dimethyl-p-aminoethylstyrene, or N,N-diethyl-p-aminoethylstyrene. Among these compounds, styrene is preferably from economic efficiency. These vinyl aromatic monomers may be used singly, or in combination of two or more types.

In addition to the above described conjugated diene monomers and vinyl aromatic monomers, other monomers that are copolymerizable with the conjugated diene monomers and the vinyl aromatic monomers can also be used.

In the polymerization step, for the purpose of adjusting the polymerization speed, the microstructure of the polymerized conjugated diene monomer unit (the ratio among cis, trans and vinyl forms), the reaction ratio between the conjugated diene monomer and the vinyl aromatic monomer, etc., a predetermined polar compound or randomizing agent can also be used.

The polar compound or the randomizing agent is not particularly limited. Examples of the polar compound or the randomizing agent include: ethers such as tetrahydrofuran, diethylene glycol dimethyl ether, or diethylene glycol dibutyl ether; amines such as triethylamine or tetramethylethylenediamine; thioethers; phosphines, phosphoramides; alkylbenzenesulfonates; and the alkoxides of potassium or sodium.

The polymerization method applied in the polymerization step is not particularly limited, and a known method can be applied. Such known methods include those described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 56-28925, Japanese Patent Laid-Open No. 59-166518, Japanese Patent Laid-Open No. 60-186577, and the like.

(Deactivation Step)

It is preferable to deactivate the active end of a polymer by a deactivation step. A method of deactivating the active end of a polymer can be achieved by allowing the active end to react with a compound having active hydrogen. A compound having active hydrogen is not particularly limited. From the view point of economic efficiency, alcohol or water is preferable.

(Hydrogenation Step)

The hydrogenation step is a step of performing a hydrogenation reaction on a portion of double bonds in the conjugated diene monomer unit of the polymer obtained by the polymerization step. A catalyst used in the hydrogenation reaction is not particularly limited. Examples of the catalyst include: supported-type heterogeneous catalysts, in which metal such as Ni, Pt, Pd or Ru is supported on a carrier such as carbon, silica, alumina or diatomaceous earth; what is called, Ziegler-type catalysts, in which organic salts such as Ni, Co, Fe or Cr, or acetylacetone salts, and a reducer such as organic Al are used; what is called, organic complex catalysts including organic metal compounds such as Ru or Rh; and homogeneous catalysts, in which a reducer such as organic Li, organic Al or organic Mg is used to a titanocene compound. Among these catalysts, homogeneous catalysts, in which a reducer such as organic Li, organic Al or organic Mg is used to a titanocene compound, are preferable from the viewpoint of economic efficiency and the heat aging resistance or weatherability of a polymer.

The hydrogenation method is not particularly limited. Examples of the hydrogenation method include the methods described in Japanese Patent Publication No. 42-8704 and Japanese Patent Publication No. 43-6636, and preferably, the methods described in Japanese Patent Publication No. 63-4841 and Japanese Patent Publication No. 63-5401. Specifically, hydrogenation is performed in an inert solvent in the presence of a hydrogenation catalyst to obtain a hydrogenated block copolymer solution.

In the hydrogenation reaction, any of a batch process, a continuous process, and a combination thereof can be used.

The hydrogenation reaction is not particularly limited. From the viewpoint of high hydrogenation activity, the hydrogenation reaction is preferably carried out after the aforementioned step of deactivating the active end of a polymer.

In the hydrogenation step, conjugated bonds in the vinyl aromatic monomer units may be hydrogenated. The hydrogenation percentage of the conjugated bonds in all of the vinyl aromatic monomer units is preferably 30 mol % or less, more preferably 10 mol % or less, and further preferably 3 mol % or less. In addition, the lower limit of the hydrogenation percentage of the conjugated bonds in all of the vinyl aromatic monomer units is not particularly limited, and it is preferably 0 mol % or more, and more preferably 1 mol % or more. By setting the hydrogenation percentage of the conjugated bonds in all of the vinyl aromatic monomer units within the above described range, the amount of the polymer added to the asphalt tends to be decreased, or compatibility with the asphalt tends to be increased.

(Desolventizing Step)

The desolventizing step is a step of removing a solvent from a solution comprising a polymer. The desolventization method is not particularly limited, and examples of the desolventization method include a steam stripping method and a direct desolventization method.

The residual amount of the solvent in the polymer, which is obtained by the desolventizing step, is preferably 2% by mass or less, more preferably 0.5% by mass or less, even more preferably 0.2% by mass or less, further preferably 0.05% by mass or less, and still further preferably 0.01% by mass or less. In addition, the lower limit of the residual solvent amount in the polymer is not particularly limited, and the smaller the residual solvent amount, more preferable it is. The residual solvent amount is more preferably 0% by mass. From the viewpoint of economic efficiency during the desolventization, it is generally in the range of 0.01% by mass or more and 0.1% by mass.

From the viewpoint of the heat aging resistance of the polymer and suppression of gelation, an antioxidant is preferably added. The antioxidant is not particularly limited. Examples of the antioxidant include: phenolic antioxidants such as a radical scavenger; phosphorus antioxidants such as a peroxide decomposer; and a sulfur antioxidants. In addition, antioxidants having both performances may also be used. These antioxidants may be used singly, or in combination of two or more types.

From the viewpoint of the heat aging resistance of the polymer or asphalt composition and suppression of gelation, among the aforementioned antioxidants, at least a phenolic antioxidant is preferably added. From the viewpoint of high manufacturability at a low temperature and low levels of degradation of polymers during the mixing, the additive amount of the phenolic antioxidant is preferably 0.05 parts by mass or more, based on 100 parts by mass of the block copolymer. The additive amount is more preferably 0.10% by mass or more, and further preferably 0.20% by mass or more. Moreover, from the viewpoint of the high stripping resistance of the aggregate and economic efficiency, the additive amount of the phenolic antioxidant is preferably 1.00% by mass or less, based on 100 parts by mass of the block copolymer. The additive amount is more preferably 0.5% by mass or less, further preferably 0.4% by mass or less, and particularly preferably 0.3% by mass or less.

Furthermore, from the viewpoint of prevention of coloration of the polymer and the improvement of mechanical strength, a decalcification step of removing metals from the polymer, or a neutralization step of adjusting the pH of the polymer, for example, addition of acid or carbon dioxide gas, may be carried out before the desolventizing step.

[Asphalt Composition]

<Asphalt (C)>

The asphalt that can be used in the present embodiment is not particularly limited. Examples of the asphalt used herein include those obtained as by-products as a result of petroleum refining (petroleum asphalt), or as natural products (natural asphalt), and mixtures of these products with petroleum. The main component of such asphalt is called bitumen. Specifically, the asphalt is not particularly limited, and examples of the asphalt include straight asphalt, semi-blown asphalt, brown asphalt, solvent deasphalting asphalt, cutback asphalt to which tar, pitch or oil is added, and asphalt emulsion. These asphalts may be used in combination. Moreover, aromatic heavy mineral oil such as petroleum solvent extract oil, or aromatic hydrocarbon process oil or extract, may be added to various types of asphalts.

A preferred asphalt is a straight asphalt having a penetration (measured according to JIS-K 2207) of preferably 30 or more and 300 or less, more preferably 40 or more and 200 or less, and further preferably 45 or more and 150 or less.

<Asphalt Composition>

From the viewpoint of the high softening point of an asphalt composition, the elongation recovery of the asphalt composition, the high ductility of the asphalt composition, and the high stripping resistance of an aggregate when a mixture is formed from the asphalt composition and the aggregate, the content of the block polymer (a) in the asphalt composition of the present embodiment is 1% by mass or more, and preferably 2% by mass or more. Moreover, from the viewpoint of a low mixing temperature for an asphalt composition, the low viscosity of the asphalt composition, low levels of degradation of polymers in the asphalt composition, and economic efficiency, the content of the block polymer (a) in the present asphalt composition is 15% by mass or less, preferably 12% by mass or less, and more preferably 10% by mass or less.

From the viewpoint of the high softening point of an asphalt composition, the elongation recovery of the asphalt composition, the high ductility of the asphalt composition, and the high stripping resistance of an aggregate when a mixture is formed from the asphalt composition and the aggregate, the content of the asphalt (c) in the asphalt composition of the present embodiment is preferably 99% by mass or less, more preferably 97% by mass or less, and further preferably 96% by mass or less. Moreover, from the viewpoint of a low mixing temperature for an asphalt composition, the low viscosity of the asphalt composition, low levels of degradation of polymers in the asphalt composition, and economic efficiency, the content of the asphalt (c) in the present asphalt composition is preferably 75% by mass or more, more preferably 85% by mass or more, even more preferably 88% by mass or more, and further preferably 90% by mass or more.

In a case where the asphalt composition of the present embodiment comprises a block polymer (b), the content of the block polymer (b) is preferably 2% to 8% by mass, more preferably 3% to 7% by mass, and further preferably 4% to 6% by mass.

The asphalt composition of the present embodiment may comprise any given petroleum resin, as necessary. The type of such a petroleum resin is not particularly limited. Examples of the petroleum resin that can be used herein include: aliphatic petroleum resins such as a C5 petroleum resin; aromatic petroleum resins such as a C9 petroleum resin; alicyclic petroleum resins such as a dicyclopentadiene petroleum resin; petroleum resins such as a C5/C9 copolymerization petroleum resin; and hydrogenated petroleum resins obtained by hydrogenation of these petroleum resins. The amount of such a petroleum resin is not particularly limited. It is preferably 1 part by mass or more and 10 parts by mass or less, and more preferably 2 parts by mass or more and 6 parts by mass or less, based on 100 parts by mass of the asphalt.

The asphalt composition of the present embodiment may comprise any given additive, as necessary. The type of such an additive is not particularly limited, as long as it is generally used in the mixing of a thermoplastic resin or a rubber-like polymer. Examples of the additive include: inorganic fillers such as calcium carbonate, magnesium carbonate, magnesium hydroxide, calcium sulfate, barium sulfate, silica, clay, talc, mica, wollastonite, montmorillonite, zeolite, alumina, titanium oxide, magnesium oxide, zinc oxide, slag wool, or glass fiber; pigments such as carbon black or iron oxide; lubricants such as stearic acid, behenic acid, zinc stearate, calcium stearate, magnesium stearate, or ethylenebisstearamide; softeners and/or plasticizers, such as a release agent, paraffinic process oil, naphthenic process oil, aromatic process oil, paraffin, organic polysiloxane, or mineral oil; antioxidants such as a hindered phenolic antioxidant or a phosphorus thermal stabilizer; reinforcing agents such as a hindered amine-based light stabilizer, a benzotriazole-based ultraviolet absorber, a flame retardant, an anti-static agent, organic fiber, glass fiber, carbon fiber, or a metal whisker; and coloring agents and other additives, or mixtures thereof, which are described in "Gum/Plastic Compounding Drugs (edited by Rubber Digest, Japan). The amount of such an additive is not particularly limited, and it can be determined, as appropriate. It is generally 50 parts by mass or less, based on 100 parts by mass of the asphalt.

In order to prevent the stripping of an asphalt composition from an aggregate when a mixture is produced from the asphalt composition and the aggregate, the asphalt composition of the present embodiment may comprise an antistripping agent.

As such an antistripping agent, resin acid is preferable. An example of the antistripping agent is polycyclic diterpene having a carboxyl group and containing 20 carbon atoms, which is rosin containing any one or more of abietic acid, dehydroabietic acid, neoabietic acid, pimaric acid, isopimaric acid, and palustric acid. Moreover, fatty acid or fatty acid amide may be added, so that it functions as an antistripping agent and as a lubricant.

The method for producing the asphalt composition of the present embodiment is not particularly limited. Moreover, conditions for stirring a mixture of a polymer and an asphalt are not particularly limited. The stirring operation can be carried out at a temperature of 120° C. or higher and 200° C. or lower. The stirring time is generally 30 minutes to 6 hours, and in terms of economic efficiency, the shorter the stirring time, the better. The stirring rate may be determined, as appropriate, depending on an apparatus used. It is generally 100 ppm or more and 8,000 rpm or less.

It is possible to produce the asphalt composition of the present embodiment at a lower temperature.

The asphalt composition of the present embodiment may also comprise other polymers, as well as the aforementioned block copolymers. Such other polymers are not particularly limited. Examples of the other polymers include: olefinic elastomers such as natural rubber, polyisoprene rubber, polybutadiene rubber, styrenebutadiene rubber, or an ethylene-propylene copolymer; and chloroprene rubber, acrylic rubber, and an ethylene-vinyl acetate copolymer.

The asphalt composition of the present embodiment can be used in the fields of road pavement, roofing and/or waterproof sheets, and sealants, and in particular, it can be preferably used in the field of road pavement. Among others, the present asphalt composition is preferably used in road pavement.

As an example for use in road pavement, there can be an example, in which a large amount of aggregate is mixed with the asphalt composition of the present embodiment, and the mixture is used in road pavement.

The aggregate is not limited, and any type of aggregate can be used as long as it is an aggregate for the pavement, which is described in "Asphalt Pavement Outline" issued by Japan Road Association. Specific examples of such an aggregate include crushed stone, round stone, gravel, and iron and steel slag. In addition, an asphalt-coated aggregate formed by coating such an aggregate with asphalt, a recycled aggregate and the like can also be used. Other than these, particulate materials similar to them, such as an artificially calcined aggregate, a calcined and foamed aggregate, an artificial lightweight aggregate, ceramic particles, luksobite, aluminum particles, plastic particles, ceramics, emery, construction waste, or fibers can also be used.

In general, the aggregate is broadly classified into a coarse aggregate, a fine aggregate, and a filler.

The coarse aggregate means an aggregate that remains on a 2.36-mm sieve, and in general, it includes several types of aggregates, such as crushed stone No. 7 in a grain diameter range of 2.5 to 5 mm, crushed stone No. 6 in a grain diameter range of 5 to 13 mm, crushed stone No. 5 in a grain diameter range of 13 to 20 mm, and further, crushed stone No. 4 in a grain diameter range of 20 to 30 mm. In the present embodiment, an aggregate prepared by mixing one or two or more types of these coarse aggregates having various grain diameter ranges, or a synthesized aggregate, or the like can be used. These coarse aggregates may be coated with straight asphalt in an amount of approximately 0.3% to 1% by weight, based on the weight of the aggregate.

The fine aggregate means an aggregate that passes through a 2.36-mm sieve but remains on a 0.075-mm sieve. Examples of such a fine aggregate include river sand, hill sand, mountain sand, sea sand, screenings, crushed stone dust, silica sand, artificial sand, glass cullet, foundry sand, and recycled aggregate-crushed sand.

The filler means a substance that passes through a 0.075-mm sieve. Examples of such a filler include a filler portion of screenings, stone powder, hydrated lime, cement, incinerated ash, clay, talc, fly ash, and carbon black. In addition to these products, rubber granular powder, cork granular powder, wood granular powder, resin granular powder, fiber granular powder, pulp, artificial aggregate and the like, which pass through a 0.075-mm sieve, can also be used as fillers.

The coarse aggregate, the fine aggregate, or the filler may be used singly, but in general, they are used in combination with one or more types.

From the viewpoint of obtaining an asphalt composition having high mass loss resistance or high strength decrease resistance upon oil adhesion, the content of the aggregate in an asphalt mixture is preferably in the range of 85% by mass or more and 98% by mass or less, and more preferably in the range of 90% by mass or more and 97% by mass or less.

The method for producing an asphalt mixture is not particularly limited. The mixing temperature applied during the mixing of the asphalt composition with the aggregate is generally set in the range of 120° C. or higher and 200° C. or lower.

As necessary, the asphalt mixture may be emulsified into water of the asphalt composition, and may be then used.

EXAMPLES

Hereinafter, the present invention will be specifically described in the following examples. However, these examples are not intended to limit the scope of the present invention. Methods for measuring polymers and asphalt compositions, which will be applied in the following examples and comparative examples, are as follows.

<Content of Vinyl Aromatic Monomer Block>

Using a polymer before hydrogenation, the content of a vinyl aromatic monomer block in the polymer was measured according to the osmium tetraoxide method described in I. M. Kolthoff, et al., J. Polym. Sci.1, p. 429 (1946). For decomposition of the polymer, 0.1 g osmic acid/125 mL tertiary butanol solution was used.

<Content of Vinyl in Block Copolymer, Hydrogenation Percentage of Unsaturated Groups in Conjugated Diene, and Content of Vinyl Aromatic Monomer Unit>

The content of vinyl in a block copolymer, the hydrogenation percentage of unsaturated groups in conjugated diene, and the content of a vinyl aromatic monomer unit were measured according to nuclear magnetic resonance spectrometry (NMR) under the conditions as described below.

In addition, the reaction solution after completion of the hydrogenation reaction was poured into a large amount of methanol, so that the block copolymer was precipitated and recovered. Subsequently, the block copolymer was extracted with acetone, the extract was then subjected to vacuum drying, and the resultant was then used as a sample for 1H-NMR measurement. Conditions for the 1H-NMR measurement are shown below.

(Measurement Conditions)

Measurement apparatus: JNM-LA400 (manufactured by JEOL)

Solvent: Deuterated chloroform

Measurement sample: Samples extracted before and after hydrogenation of the polymer Sample concentration: 50 mg/mL Observed frequency: 400 MHz Chemical shift standard: TMS (tetramethylsilane)

Pulse delay: 2.904 seconds

The number of scanning operations: 64

Pulse width: 45°

Measurement temperature: 26° C.

<Ratio of the Content of the Vinyl Aromatic Monomer Block to the Total Content of the Vinyl Aromatic Monomer Unit in the Block Copolymer (a) (Block Percentage)>

The ratio of the content of the vinyl aromatic monomer block to the total content of the vinyl aromatic monomer unit in the block copolymer (a) was obtained according to the following formula, using the values of the content of the vinyl aromatic monomer block and the content of the vinyl aromatic monomer unit, which are obtained by the above described measurement methods:

Block percentage=(content of vinyl aromatic monomer block in block copolymer (a))/total content of vinyl aromatic monomer unit in block copolymer (a))×100

<Number Average Molecular Weight>

The number average molecular weight was measured by GPC [the apparatus used in GPC was manufactured by Waters]. In the GPC measurement, tetrahydrofuran was used as a solvent, and the temperature was set at 35° C. The molecular weight of a peak in the chromatogram was obtained using a calibration curve (which had been produced using the molecular weight of the peak of standard polystyrene) that had been obtained by the measurement of commercially available standard polystyrene. The obtained molecular weight was defined as a number average molecular weight (a molecular weight relative to polystyrene).

<Mass Ratio Between Block Copolymer (a-1) and Block Copolymer (a-2)>

Inflection points on individual peak curves obtained by the above described GPC were vertically divided, and the ratio of each divided area to the total area was defined as an area ratio of each component, so as to obtain a mass ratio. Regarding individual peak inflection points, peak division was carried out by fitting processing according to Gaussian approximation, using EcoSEC waveform separation software, so that the point at which individual peaks intersect was defined as an inflection point.

<Method of Polymerizing Polymer>

(Block Copolymer 1: Corresponding to the Block Copolymer (A))

An autoclave made of stainless steel (internal volume: 10 L), which was equipped with a stirrer and a jacket, was subjected to washing, drying, and nitrogen substitution. Then, 5720 g of cyclohexane and 304 g of previously purified styrene were added to the autoclave, and hot water was then supplied to the jacket, so that the temperature of the content was set at approximately 40° C.

Subsequently an n-butyllithium cyclohexane solution (1.20 g as purity) was added to the autoclave, so as to initiate polymerization of the styrene.

Six minutes after the temperature had reached the maximum temperature (52° C.) as a result of the polymerization of the styrene, namely, after the temperature was decreased by 2° C. from the maximum temperature, 496 g of butadiene (1,3-butadiene) was added to the autoclave, and the polymerization was continued. Thirty seconds after the butadiene had been almost completely polymerized and the temperature had reached the maximum temperature (89° C.), tetraethoxysilane was added as a coupling agent to the autoclave, so that coupling was carried out.

Twenty minutes after addition of the coupling agent, water was added to the autoclave for deactivation, so as to obtain a block copolymer solution.

Octadecyl-3-(3,5-dibutyl-t-butyl-4-hydroxyphenyl)propionate was added to the obtained block copolymer solution, in an amount of 0.25 parts by mass based on 100 parts by mass of the above described block copolymer, and the obtained mixture was then fully blended to obtain a block copolymer 1.

The obtained block copolymer 1 was a mixture of block copolymers, and the ratio of the structures was, S-B/(S-B)3-X/(S-B)4-X=73/17/10% by mass, the number average molecular weight of the S-B structure was 48,000, the number average molecular weight of (S-B)3-X was 3 times higher than the number average molecular weight of the S-B structure, and the number average molecular weight of (S-B)4-X was 4 times higher than the number average molecular weight of the S-B structure.

It is to be noted, in the present Examples, S represents a polymer block comprising, as a main component, a vinyl aromatic monomer unit; B represents a polymer block comprising, as a main component, a conjugated diene monomer unit; and X represents a residue of a coupling agent or a residue of a polymerization initiator.

Moreover, in the block copolymer 1, the content of the vinyl aromatic monomer unit was 38% by mass, and the block percentage of the block copolymer (a) was 97% by mass.

(Block Copolymer 2: Corresponding to the Block Copolymer (a))

An autoclave made of stainless steel (internal volume: 10 L), which was equipped with a stirrer and a jacket, was subjected to washing, drying, and nitrogen substitution. Then, 5720 g of cyclohexane and 344 g of previously purified styrene were added to the autoclave, and hot water was then supplied to the jacket, so that the temperature of the content was set at approximately 40° C.

Subsequently an n-butyllithium cyclohexane solution (1.22 g as purity) was added to the autoclave, so as to initiate polymerization of the styrene.

Six minutes after the temperature had reached the maximum temperature (53° C.) as a result of the polymerization of the styrene, namely, after the temperature was decreased by 2° C. from the maximum temperature, 456 g of butadiene (1,3-butadiene) was added to the autoclave. Thirty seconds after the butadiene had been almost completely polymerized and the temperature had reached the maximum temperature (89° C.), tetraethoxysilane was added as a coupling agent to the autoclave, so that coupling was carried out.

Twenty minutes after addition of the coupling agent, water was added to the autoclave for deactivation, so as to obtain a block copolymer solution.

Octadecyl 3-(3,5-dibutyl-t-butyl-4-hydroxyphenyl)propionate was added to the obtained block copolymer solution, in an amount of 0.25 parts by mass based on 100 parts by mass of the above described block copolymer, and the obtained mixture was then fully blended to obtain a block copolymer 2.

The obtained block copolymer 2 was a mixture of block copolymers, and the ratio of the structures was, S-B/(S-B)3-X/(S'B)4-X=71/18/11% by mass, the number average molecular weight of the S-B structure was 44,000, the number average molecular weight of (S-B)3-X was 3 times higher than the number average molecular weight of the S-B structure, and the number average molecular weight of (S-B)4-X was 4 times higher than the number average molecular weight of the S-B structure.

Moreover, in the block copolymer 2, the content of the vinyl aromatic monomer unit was 43% by mass, and the block percentage of the block copolymer (a) was 97% by mass.

(Block Copolymer 3: Corresponding to the Block Copolymer (a))

A block copolymer 3 was produced by the same method as the above described method for producing the block copolymer 2, with the exceptions that 21 minutes after the temperature had reached the maximum temperature (53° C.) as a result of the polymerization of the styrene, namely, after the temperature was decreased by 6° C. from the maximum temperature, 456 g of butadiene (1,3-butadiene) was added to the autoclave, and then 30 seconds after the butadiene had been almost completely polymerized and the temperature had reached the maximum temperature (89° C.), tetraethoxysilane was added as a coupling agent to the autoclave, so that coupling was carried out.

The obtained block copolymer 3 was a mixture of block copolymers, and the ratio of the structures was, S-B/(S-B)3-X/(S-B)4-X=71/18/11% by mass, the number average molecular weight of the S-B structure was 44,000, the number average molecular weight of (S-B)3-X was 3 times higher than the number average molecular weight of the S-B structure, and the number average molecular weight of (S-B)4-X was 4 times higher than the number average molecular weight of the S-B structure.

Moreover, in the block copolymer 3, the content of the vinyl aromatic monomer unit was 43% by mass, and the block percentage of the block copolymer (a) was 99.5% by mass.

(Block Copolymer 4: Corresponding to the Block Copolymer (a))

An autoclave made of stainless steel (internal volume: 10 L), which was equipped with a stirrer and a jacket, was subjected to washing, drying, and nitrogen substitution. Then, 5720 g of cyclohexane and 344 g of previously purified styrene were added to the autoclave, and hot water was then supplied to the jacket, so that the temperature of the content was set at approximately 40° C.

Subsequently an n-butyllithium cyclohexane solution (0.86 g as purity) was added to the autoclave, so as to initiate polymerization of the styrene.

Six minutes after the temperature had reached the maximum temperature (53° C.) as a result of the polymerization of the styrene, namely, after the temperature was decreased by 2° C. from the maximum temperature, 456 g of butadiene (1,3-butadiene) was added to the autoclave, and the polymerization was continued. Thirty seconds after the butadiene had been almost completely polymerized and the temperature had reached the maximum temperature (89° C.), a mixture consisting of a diglycidyl etherified product of 2,2-bis(4-hydroxyphenyl)propane modified with epichlorohydrin and a diglycidyl etherified product of phenol-formaldehyde polycondensate modified with epichlorohydrin at a weight ratio of 1/1, was added as a coupling agent to the autoclave, so that coupling was carried out.

Ten minutes after addition of the coupling agent, water was added to the autoclave for deactivation, so as to obtain a block copolymer solution.

Octadecyl 3-(3,5-dibutyl-t-butyl-4-hydroxyphenyl)propionate was added to the obtained block copolymer solution, in an amount of 0.25 parts by mass based on 100 parts by mass of the above described block copolymer, and the obtained mixture was then fully blended to obtain a block copolymer 4.

The obtained block copolymer 4 was a mixture of block copolymers, and the ratio of the structures was, S-B/(S-B)2-X=70/30% by mass, the number average molecular weight of the S-B structure was 58,000, and the number average molecular weight of (S-B)2-X was 2 times higher than the number average molecular weight of the S-B structure.

Moreover, in the block copolymer 4, the content of the vinyl aromatic monomer unit was 43% by mass, and the block percentage of the block copolymer (a) was 97% by mass.

(Block Copolymer 5: Corresponding to the Block Copolymer (a))

A block copolymer 5 was produced by the same method as the above described method for producing the block copolymer 4, with the exceptions that immediately after the temperature had reached the maximum temperature (51° C.) as a result of the polymerization of the styrene, 456 g of butadiene (1,3-butadiene) was added to the autoclave, then the polymerization was continued, and 30 seconds after the butadiene had been almost completely polymerized and the temperature had reached the maximum temperature (89° C.), a coupling agent was added to the autoclave.

The obtained block copolymer 5 was a mixture of block copolymers, and the ratio of the structures was, S-B/(S-B)2-X=70/30% by mass, the number average molecular weight of the S-B structure was 58,000, and the number average molecular weight of (S-B)2-X was 2 times higher than the number average molecular weight of the S-B structure.

Moreover, in the block copolymer 5, the content of the vinyl aromatic monomer unit was 43% by mass, and the block percentage of the block copolymer (a) was 89% by mass.

(Block Copolymer 6: Corresponding to the Block Copolymer (a))

An autoclave made of stainless steel (internal volume: 10 L), which was equipped with a stirrer and a jacket, was subjected to washing, drying, and nitrogen substitution. Then, 5720 g of cyclohexane and 280 g of previously purified styrene were added to the autoclave, and hot water was then supplied to the jacket, so that the temperature of the content was set at approximately 40° C.

Subsequently an n-butyllithium cyclohexane solution (0.80 g as purity) was added to the autoclave, so as to initiate polymerization of the styrene.

Six minutes after the temperature had reached the maximum temperature (52° C.) as a result of the polymerization of the styrene, namely, after the temperature was decreased by 2° C. from the maximum temperature, 520 g of butadiene (1,3-butadiene) was added to the autoclave, and the polymerization was continued. Thirty seconds after the butadiene had been almost completely polymerized and the temperature had reached the maximum temperature (90° C.), a mixture consisting of a diglycidyl etherified product of 2,2-bis(4-hydroxyphenyl)propane modified with epichlorohydrin and a diglycidyl etherified product of phenol-formaldehyde polycondensate modified with epichlorohydrin at a weight ratio of 1/1, was added as a coupling agent to the autoclave, so that coupling was carried out.

Ten minutes after addition of the coupling agent, water was added to the autoclave for deactivation, so as to obtain a block copolymer solution.

Octadecyl 3-(3,5-dibutyl-t-butyl-4-hydroxyphenyl)propionate was added to the obtained block copolymer solution, in an amount of 0.25 parts by mass based on 100 parts by mass of the above described block copolymer, and the obtained mixture was then fully blended to obtain a block copolymer 6.

The obtained block copolymer 6 was a mixture of block copolymers, and the ratio of the structures was, S-B/(S-B)2-X=65/35% by mass, the number average molecular weight of the S-B structure was 69,000, and the number average molecular weight of (S-B)2-X was 2 times higher than the number average molecular weight of the S-B structure.

Moreover, in the block copolymer 6, the content of the vinyl aromatic monomer unit was 35% by mass, and the block percentage of the block copolymer (a) was 97% by mass.

(Block Copolymer 7: Corresponding to the Block Copolymer (b))

An autoclave made of stainless steel (internal volume: 10 L), which was equipped with a stirrer and a jacket, was subjected to washing, drying, and nitrogen substitution. Then, 5720 g of cyclohexane and 240 g of previously purified styrene were added to the autoclave, and hot water was then supplied to the jacket, so that the temperature of the content was set at approximately 40° C.

Subsequently an n-butyllithium cyclohexane solution (0.70 g as purity) was added to the autoclave, so as to initiate polymerization of the styrene.

Seven minutes after the temperature had reached the maximum temperature (51° C.) as a result of the polymerization of the styrene, namely, after the temperature was decreased by 2° C. from the maximum temperature, 560 g of butadiene (1,3-butadiene) was added to the autoclave, and the polymerization was continued. Thirty seconds after the butadiene had been almost completely polymerized and the temperature had reached the maximum temperature (90° C.), a mixture consisting of a diglycidyl etherified product of 2,2-bis(4-hydroxyphenyl)propane modified with epichlorohydrin and a diglycidyl etherified product of phenol-formaldehyde polycondensate modified with epichlorohydrin at a weight ratio of 1/1, was added as a coupling agent to the autoclave, so that coupling was carried out.

Ten minutes after addition of the coupling agent, water was added to the autoclave for deactivation, so as to obtain a block copolymer solution.

Octadecyl 3-(3,5-dibutyl-t-butyl-4-hydroxyphenyl)propionate was added to the obtained block copolymer solution, in an amount of 0.25 parts by mass based on 100 parts by mass of the above described block copolymer, and the obtained mixture was then fully blended to obtain a block copolymer 7.

The obtained block copolymer 7 was a mixture of block copolymers, and the ratio of the structures was, S-B/(S-B)2-X=20/80% by mass, the number average molecular weight of the S-B structure was 75,000, and the number average molecular weight of (S-B)2-X was 2 times higher than the number average molecular weight of the S-B structure.

Moreover, in the block copolymer 7, the content of the vinyl aromatic monomer unit was 30% by mass, and the block percentage of the block copolymer (a) was 97% by mass.

(Block Copolymer 8: Corresponding to the Block Copolymer (a))

A block copolymer 8 was produced by the same method as the above described method for producing the block copolymer 4, with the exception that the amount of the coupling agent was changed.

The obtained block copolymer 8 was a mixture of block copolymers, and the ratio of the structures was, S-B/(S-B)2-X=60/40% by mass, the number average molecular weight of the S-B structure was 58,000, and the number average molecular weight of (S-B)2-X was 2 times higher than the number average molecular weight of the S-B structure.

Moreover, in the block copolymer 8, the content of the vinyl aromatic monomer unit was 43% by mass, and the block percentage of the block copolymer (a) was 97% by mass.

(Block Copolymer 9: Corresponding to the Block Copolymer (a))

A block copolymer 9 was produced by the same method as the above described method for producing the block copolymer 4, with the exception that the amount of the coupling agent was changed.

The obtained block copolymer 9 was a mixture of block copolymers, and the ratio of the structures was, S-B/(S-B)2-X=57/43% by mass, the number average molecular weight of the S-B structure was 58,000, and the number average molecular weight of (S-B)2-X was 2 times higher than the number average molecular weight of the S-B structure.

Moreover, in the block copolymer 9, the content of the vinyl aromatic monomer unit was 43% by mass, and the block percentage of the block copolymer (a) was 97% by mass.

(Block Copolymer 10: Corresponding to, Neither the Block Copolymers (A) Nor (B))

A block copolymer 10 was produced by the same method as the above described method for producing the block copolymer 4, with the exception that the amount of the coupling agent was changed.

The obtained block copolymer 10 was a mixture of block copolymers, and the ratio of the structures was, S-B/(S-B)2-X=35/65% by mass, the number average molecular weight of the S-B structure was 58,000, and the number average molecular weight of (S-B)2-X was 2 times higher than the number average molecular weight of the S-B structure.

Moreover, in the block copolymer 10, the content of the vinyl aromatic monomer unit was 43% by mass, and the block percentage of the block copolymer (a) was 97% by mass.

(Block Copolymer 11: Corresponding to the Block Copolymer (a))

<Preparation Example of Hydrogenation Catalyst>

To a nitrogen-substituted reactor, 1 L of dried and purified cyclohexane was added, and thereafter, 100 mmol bis(cyclopentadienyl)titanium dichloride was then added thereto. While fully stirring the obtained mixture, an n-hexane solution containing 200 mmol trimethyl aluminum was added thereto, and the thus obtained mixture was then reacted at a room temperature for about 3 days to obtain a hydrogenation catalyst.

A block copolymer 11 was obtained by the same method as the above described method for producing the block copolymer 1, with the exception that after addition of the coupling agent, water was added for deactivation, and thereafter, the above described hydrogenation catalyst was used to hydrogenate 32 mol % of double bonds in the conjugated diene monomer unit in the block copolymer.

The obtained block copolymer 11 was a mixture of block copolymers, and the ratio of the structures was, S-B/(S-B)3-X/(S-B)4-X=73/17/10% by mass, the number average molecular weight of the S-B structure was 48,000, the number average molecular weight of (S-B)3-X was 3 times higher than the number average molecular weight of the S-B structure, and the number average molecular weight of (S-B)4-X was 4 times higher than the number average molecular weight of the S-B structure.

Moreover, in the block copolymer 11, the content of the vinyl aromatic monomer unit was 38% by mass, and the block percentage of the block copolymer (a) was 97% by mass.

(Block Copolymer 12: Corresponding to the Block Copolymer (b))

A block copolymer 12 was obtained by the same method as the above described method for producing the block copolymer 7, with the exceptions that after addition of the coupling agent, water was added for deactivation, and thereafter, the hydrogenation catalyst prepared by the above described method for producing the block copolymer 11 was used to hydrogenate 32 mol % of double bonds in the conjugated diene monomer unit in the block copolymer.

The obtained block copolymer 12 was a mixture of block copolymers, and the ratio of the structures was, S-B/(S-B)2-X=20/80% by mass, the number average molecular weight of the S-B structure was 75,000, and the number average molecular weight of (S-B)2-X was 2 times higher than the number average molecular weight of the S-B structure Moreover, in the block copolymer 12, the content of the vinyl aromatic monomer unit was 30% by mass, and the block percentage of the block copolymer (a) was 97% by mass.

Examples 1 to 20 and Comparative Examples 1 to 4

<Method for Producing Asphalt Composition>

500 g of straight asphalt 60-80 [manufactured Nippon Oil Corporation] was added into a 750-mL metallic can, and the metallic can was fully immersed in an oil bath at 160° C.

Subsequently, while the asphalt that was in a melted state was stirred at a rotation rate of 4000 rpm, a predetermined amount of each polymer shown in Table 1 or 2 was added to the asphalt, and after completion of the addition, the obtained mixture was stirred for 120 minutes to produce an asphalt composition.

<Evaluation of Asphalt Composition>

The physical properties of the above-produced asphalt compositions were measured by the methods as described below. The measurement results are shown in Tables 1 and 2.

(Low-Temperature Manufacturability)

According to the above described method for producing an asphalt composition, as shown in Table 1 or 2, a predetermined amount of each polymer was added to the above described asphalt, and the obtained mixture was then melted and kneaded at 160° C. for a certain period of time. Thereafter, the melted and kneaded asphalt composition was scooped using a 200-mesh wire mesh made of stainless steel, and as a result, when no polymer particles remained on the metal wire, it was determined that the asphalt composition was completely dissolved.

When the time required for complete dissolution was short, the asphalt composition was considered to have high low-temperature manufacturability, and the results were evaluated with the symbols ○, Δ, and ×, based on the following criteria.

[Evaluation Criteria]

Case where the polymer was completely dissolved within 90 minutes: ○
Case where the polymer was completely dissolved at more than 90 minutes and within 120 minutes: Δ
Case where the polymer was not completely dissolved even after 120 minutes: ×

(Melt Viscosity)

The melt viscosity of the asphalt composition at 160° C. was measured using a Brookfield viscometer.

As the melt viscosity of the asphalt composition was decreased, higher manufacturability could be obtained. The results were evaluated with the symbols ○, Δ, and ×, based on the following criteria.

[Evaluation Criteria]

Table 1: Case where the additive amount of the block copolymer is 5% by mass
Melt viscosity of less than 300 mPa·s: ○
Melt viscosity of 300 mPa·s or more and less than 350 mPa·s: Δ
Melt viscosity of 350 mPa·s or more: ×
Table 2: Case where the additive amount of the block copolymer is 8% by mass
Melt viscosity of less than 600 mPa·s: ○
Melt viscosity of 600 mPa·s or more and less than 700 mPa·s: Δ
Melt viscosity of 700 mPa·s or more: ×

(Softening Point)

In accordance with JIS-K 2207, the softening point of the asphalt composition was measured by a ring & ball method. A predetermined ring was filled with a sample, and it was then horizontally supported in a glycerin solution. Then, 3.5 g of a ball was placed in the center of the sample, and the liquid temperature was then increased at a rate of 5° C./min. The temperature, at which the sample was contacted with the bottom plate of the ring stand due to the weight of the ball, was measured.

As the softening point of the asphalt composition was increased, better fluidity resistance could be obtained. The results were evaluated with the symbols ○, Δ, and X, based on the following criteria.

[Evaluation Criteria]

Table 1: Case where the additive amount of the block copolymer is 5% by mass
Softening point of 60° C. or higher: ○
Softening point of 56° C. or higher and lower than 60° C.: Δ
Softening point of lower than 56° C.: ×
Table 2: Case where the additive amount of the block copolymer is 8% by mass
Softening point of 85° C. or higher: ○
Softening point of 80° C. or higher and lower than 85° C.: Δ
Softening point of lower than 80° C.: ×

(Penetration)

In accordance with JIS-K 2207, a length, which was required for a predetermined needle to penetrate into a sample kept at 25° C. in a constant temperature water bath for 5 seconds, was measured.

As the penetration was increased, the asphalt composition could have better fatigue resistance. The results were evaluated with the symbols ○, Δ, and ×, based on the following criteria.

[Evaluation Criteria]

Table 1: Case where the additive amount of the block copolymer is 5% by mass
Penetration of 45 dmm or more: ○
Penetration of 40 dmm or more and less than 45 dmm: Δ
Penetration of less than 40 dmm: ×
Table 2: Case where the additive amount of the block copolymer is 8% by mass
Penetration of 45 dmm or more: ○
Penetration of 40 dmm or more and less than 45 dmm: Δ
Penetration of less than 40 dmm: ×

(Elongation)

In accordance with JIS-K 2207, a sample was poured into a mould, so as to obtain a predetermined shape, and it was then kept at 15° C. in a constant temperature water bath. Subsequently, the sample was pulled at a rate of 5 cm/min, and the distance (elongation) extended before the sample was broken was then measured.

As the elongation was increased, the asphalt composition could have better low-temperature cracking resistance. The results were evaluated with the symbols ○, Δ, and ×, based on the following criteria.

[Evaluation Criteria]

Table 1: Case where the additive amount of the block copolymer is 5% by mass
Elongation of 50 cm or more: ○
Elongation of 30 cm or more and less than 50 cm: Δ
Elongation of less than 30 cm: ×
Table 2: Case where the additive amount of the block copolymer is 8% by mass
Elongation of 60 cm or more: ○
Elongation of 50 cm or more and less than 60 cm: Δ
Elongation of less than 50 cm: ×

(Toughness)

In accordance with JEAAS, a sample was placed in a predetermined container, and at this time, the height of the upper surface of a tension head was adjusted to be the same as the height of the surface of the sample. Thereafter, the sample kept at 25° C. in a constant temperature water bath was pulled at a rate of 500 mm/min by a tensile testing machine, and based on a graph involving displacement and load at that time, toughness was measured.

As the toughness of the asphalt composition was increased, the asphalt composition could have better aggregate scattering resistance. The results were evaluated with the symbols ○, Δ, and ×, based on the following criteria.
[Evaluation Criteria]
Table 1: Case where the additive amount of the block copolymer is 5% by mass
Toughness of 15 N·m or more: ○
Toughness of 8 N·m or more and less than 15 N·m: Δ
Toughness of 8 less than N·m: ×
Table 2: Case where the additive amount of the block copolymer is 8% by mass
Toughness of 30 N·m or more: ○
Toughness of 20 N·m or more and less than 30 N·m: Δ
Toughness of less than 20 N·m: ×
(Tenacity)

In accordance with JEAAS, tenacity was measured by the same method as that in the case of the above described toughness.

As the tenacity of the asphalt composition was increased, the asphalt composition could have better aggregate scattering resistance. The results were evaluated with the symbols ○, Δ, and ×, based on the following criteria.
[Evaluation Criteria]
Table 1: Case where the additive amount of the block copolymer is 5% by mass
Tenacity of 8 N·m or more: ○
Tenacity of 4 N·m or more and less than 8 N·m: Δ
Tenacity of less than 4 N·m: ×
(Thermal Degradation Resistance of Polymer (Degradation of Polymer in Composition))

An asphalt composition comprising 5% by mass of the polymer, which was produced by the above described method, was stored at 180° C. After a certain period of time had passed, sampling was carried out. A change in the molecular weight distribution of block copolymer was analyzed by GPC.

The peak height of the largest peak area, among the peaks of polymers obtained by GPC, is decreased by thermal degradation of the polymer. Thus, using the number of days, at which a change in the peak height represented by the following formula becomes 30% or more, the thermal degradation resistance of the polymer was evaluated.

Change in peak height=peak height of polymer before storage/peak height of polymer after certain period of time has passed×100

The greater the number of days at which a change in the peak height of the polymer becomes 30% or more, the better the thermal degradation resistance of the asphalt composition that could be obtained. The results were evaluated with the symbols ○, Δ, and ×, based on the following criteria.
[Evaluation Criteria]
Number of days, at which a change in the peak height of the polymer becomes 30% or more, is 2 or more days: ○
Number of days, at which a change in the peak height of the polymer becomes 30% or more, is 1 day or more and less than 2 days: Δ
Number of days, at which a change in the peak height of the polymer becomes 30% or more, is less than 1 day: ×
<Evaluation of Asphalt Mixture>
(Stripping Resistance Between Asphalt Composition and Aggregate)

In accordance with the method of testing the stripping resistance of a coarse aggregate, described in A017, the second volume of "Hosou Chosa/Shiken Hoho Binran (Pavement Search/Test Method Handbook)" (first edition printed on June 2007), published by Japan Road Association, a test regarding the stripping resistance between an asphalt composition and an aggregate was carried out. As an aggregate, tight sandstones brought from Iwafune-machi, Shimotsuga-gun, Tochigi-prefecture were used.

Evaluation of the stripping resistance between an asphalt composition and an aggregate was carried out based on the stripping area ratio obtained by the above described test.

As the stripping area ratio was decreased, the stripping resistance between the asphalt composition and the aggregate could be better. The results were evaluated with the symbols ⊚, ○, Δ, and ×, based on the following criteria.
[Evaluation Criteria]
Stripping area ratio of less than 2%: ⊚
Stripping area ratio of 2% or more and less than 3.5%: ○
Stripping area ratio of 3.5% or more and less than 5%: Δ
Stripping area ratio of 5% or more: ×

TABLE 1

| | | Example | | | | | | | | | | | Comparative Example | |
|---|---|---|---|---|---|---|---|---|---|---|---|---|---|---|
| Polymer structure | | 1 | 2 | 3 | 4 | 5 | 6 | 7 | 8 | 9 | 10 | 1 | 2 |
| Composition of asphalt | Block copolymer 1 | 5 | | | | | | 2.5 | | | | | |
| | Block copolymer 2 | | 5 | | | | | | | | | | |
| | Block copolymer 3 | | | 5 | | | | | | | | | |
| | Block copolymer 4 | | | | 5 | | | | | | | | |
| | Block copolymer 5 | | | | | 5 | | | | | | | |
| | Block copolymer 6 | | | | | | 5 | | | | | | |
| | Block copolymer 7 | | | | | | | 2.5 | | | | 5 | |
| | Block copolymer 8 | | | | | | | | 5 | | | | |
| | Block copolymer 9 | | | | | | | | | 5 | | | |
| | Block copolymer 10 | | | | | | | | | | | | 5 |
| | Block copolymer 11 | | | | | | | | | | 2.5 | | |
| | Block copolymer 12 | | | | | | | | | | 2.5 | | |
| | Asphalt | 95 | 95 | 95 | 95 | 95 | 95 | 95 | 95 | 95 | 95 | 95 | 95 |
| Evaluation results of asphalt compositions | Low-temperature manufacturability | ○ | ○ | ○ | ○ | ○ | ○ | ○ | ○ | Δ | ○ | × | × |
| | Melt viscosity | ○ | ○ | ○ | ○ | ○ | ○ | ○ | ○ | Δ | ○ | × | × |
| | Softening point | Δ | ○ | ○ | Δ | Δ | Δ | ○ | ○ | ○ | ○ | ○ | ○ |
| | Penetration | ○ | ○ | Δ | Δ | Δ | ○ | ○ | Δ | Δ | ○ | × | × |
| | Elongation | ○ | ○ | Δ | ○ | Δ | Δ | ○ | ○ | Δ | ○ | Δ | × |
| | Toughness | ○ | ○ | ○ | ○ | ○ | ○ | ○ | ○ | Δ | ○ | ○ | Δ |
| | Tenacity | ○ | ○ | ○ | ○ | ○ | ○ | ○ | ○ | Δ | ○ | ○ | Δ |
| | Thermal degradation of polymer | ○ | ○ | ○ | ○ | ○ | ○ | ○ | Δ | Δ | ○ | Δ | Δ |

TABLE 1-continued

|  |  | Example | | | | | | | | | | Comparative Example | |
|---|---|---|---|---|---|---|---|---|---|---|---|---|---|
| Polymer structure | | 1 | 2 | 3 | 4 | 5 | 6 | 7 | 8 | 9 | 10 | 1 | 2 |
| Evaluation results of asphalt mixtures | Stripping resistance of aggregate | ◎ | ◎ | ◎ | ○ | ○ | Δ | ◎ | Δ | Δ | ◎ | X | X |

TABLE 2

|  | Polymer structure | Example | | | | | | | | | | Comparative Example | |
|---|---|---|---|---|---|---|---|---|---|---|---|---|---|
|  | Structure | 11 | 12 | 13 | 14 | 15 | 16 | 17 | 18 | 19 | 20 | 3 | 4 |
| Composition of asphalt | Block copolymer 1 | 8 | | | | | | 4 | | | | | |
|  | Block copolymer 2 | | 8 | | | | | | | | | | |
|  | Block copolymer 3 | | | 8 | | | | | | | | | |
|  | Block copolymer 4 | | | | 8 | | | | | | | | |
|  | Block copolymer 5 | | | | | 8 | | | | | | | |
|  | Block copolymer 6 | | | | | | 8 | | | | | | |
|  | Block copolymer 7 | | | | | | | 4 | | | 8 | | |
|  | Block copolymer 8 | | | | | | | | 8 | | | | |
|  | Block copolymer 9 | | | | | | | | | 8 | | | |
|  | Block copolymer 10 | | | | | | | | | | | | 8 |
|  | Block copolymer 11 | | | | | | | | | | 4 | | |
|  | Block copolymer 12 | | | | | | | | | | 4 | | |
|  | Asphalt | 92 | 92 | 92 | 92 | 92 | 92 | 92 | 92 | 92 | 92 | 92 | 92 |
| Evaluation results of asphalt compositions | Low-temperature manufacturability | Δ | ○ | ○ | Δ | Δ | Δ | ○ | Δ | Δ | Δ | X | X |
|  | Melt viscosity | ○ | ○ | ○ | ○ | ○ | ○ | ○ | ○ | Δ | ○ | X | X |
|  | Softening point | Δ | ○ | ○ | Δ | Δ | Δ | ○ | ○ | ○ | ○ | ○ | ○ |
|  | Penetration | ○ | ○ | Δ | Δ | Δ | Δ | Δ | Δ | Δ | ○ | X | X |
|  | Elongation | ○ | ○ | Δ | ○ | Δ | Δ | ○ | ○ | Δ | ○ | Δ | X |
|  | Toughness | ○ | ○ | ○ | ○ | ○ | ○ | ○ | ○ | Δ | ○ | Δ | Δ |
|  | Thermal degradation of polymer | ○ | ○ | ○ | ○ | ○ | ○ | ○ | Δ | Δ | ○ | Δ | Δ |
| Evaluation results of asphalt mixtures | Stripping resistance of aggregate | ◎ | ◎ | ◎ | ○ | ○ | Δ | ◎ | Δ | Δ | ◎ | X | X |

It is found for the first time that, by producing an asphalt composition comprising 1% to 15% by mass of a block copolymer (a), which is characterized in that, for example, the block copolymer (a) consists of a mixture comprising two or more polymers selected from the group consisting of general formulae (S-B)n, B-(S-B)n, S-(B-S)n, S-(B-S)n-X, [(S-B)k]m-X, and [(S-B)k-S]m-X (wherein m, n and k each represent an integer; S represents a polymer block comprising, as a main component, a vinyl aromatic monomer unit; and B represents a polymer block comprising, as a main component, a conjugated diene monomer unit), and the total amount of S-B and S-B-X in the block copolymer (a) is 40% by mass or more and 85% by mass or less, and the content of the vinyl aromatic monomer unit in the block copolymer (a) is 34% by mass or more and 55% by mass or less, and the number average molecular weight of S-B and S-B-X in the block copolymer (a) is in the range of 20,000 to 73,000, a mixing temperature applied during the production of the asphalt composition can be decreased, the viscosity of the asphalt composition can be decreased, levels of degradation of polymers in the asphalt composition can be reduced, and the stripping resistance of an aggregate when a mixture is formed from the asphalt composition and the aggregate can be increased.

The present application is based on Japanese Patent Application No. 2014-111763, filed on May 29, 2014; the disclosure of which is hereby incorporated by reference.

INDUSTRIAL APPLICABILITY

The asphalt composition of the present invention can be used in the fields of road pavement, roofing and/or waterproof sheets, and sealants, and in particular, it can be preferably used in the field of road pavement.

The invention claimed is:
1. An asphalt composition comprising
(i) 1% to 15% by mass of a block copolymer (a) and an asphalt (c), wherein
the block copolymer (a) comprises a block copolymer (a-1) and a block copolymer (a-2), wherein
the block copolymer (a-1) has a polymer block comprising a vinyl aromatic monomer unit, and a polymer block comprising a conjugated diene monomer unit,
the block copolymer (a-2) has a polymer block comprising a vinyl aromatic monomer unit, and a polymer block comprising a conjugated diene monomer unit,
a content of the block copolymer (a-1) in the total mass of the block copolymer (a) is 40% by mass or more and 85% by mass or less, a content of the block copolymer (a-2) in the total mass of the block copolymer (a) is 15% by mass or more and 60% by mass or less, a content of the vinyl aromatic monomer unit in the block copolymer (a) is 34% by mass or more and 55% by mass or less, a number average molecular weight of the block copolymer (a-1) is in the range of 20,000 to 73,000, and a number average molecular weight of the block copolymer (a-2) is 1.5 to 5.0 times higher than the number average molecular weight of the block copolymer (a-1), and (ii) 0.5% to 10% by mass of a block copolymer (b), wherein the block copolymer (b) has a polymer block comprising a vinyl aromatic monomer unit, and a polymer block comprising a conjugated diene monomer unit, and a content of the vinyl aromatic monomer unit in the block copolymer (b) is 24% by mass or more and less than 34% by mass.

2. The asphalt composition according to claim 1, wherein the block copolymer (a-1) has one polymer block comprising a vinyl aromatic monomer unit, and one polymer block comprising a conjugated diene monomer unit, and the block copolymer (a-2) has two or more polymer blocks each comprising a vinyl aromatic monomer unit, and one or more polymer blocks each comprising a conjugated diene monomer unit.

3. The asphalt composition according to claim 1, wherein the block copolymer (a-2) comprises at least one block copolymer selected from the group consisting of (S-B)n+1, B-(S-B)n+1, S-(B-S)n, S-(B-S)n-X, [(S-B)k]m-X, and [(S-B)k-S]m-X (wherein, in each formula, m represents an integer of 2 to 6; n and k each independently represent an integer of 1 to 4; S represents a polymer block comprising a vinyl aromatic monomer unit; B represents a polymer block comprising a conjugated diene monomer unit; and X represents a residue of a coupling agent or a residue of a polymerization initiator).

4. The asphalt composition according to claim 1, wherein the block copolymer (a-2) comprises at least a block copolymer represented by (S-B)3-X (wherein S represents a polymer block comprising a vinyl aromatic monomer unit; B represents a polymer block comprising a conjugated diene monomer unit; and X represents a residue of a coupling agent).

5. The asphalt composition according to claim 1, wherein the content of the block copolymer (a-1) in the block copolymer (a) is 55% by mass or more and 85% by mass or less.

6. The asphalt composition according to claim 1, wherein a ratio of the content of a vinyl aromatic monomer block to the total content of the vinyl aromatic monomer unit in the block copolymer (a) is in the range of 90.0% to 99.0% by mass.

7. The asphalt composition according to claim 1, wherein the block copolymer (b) comprises a block copolymer (b-1) and a block copolymer (b-2), wherein the block copolymer (b-1) has a polymer block comprising a vinyl aromatic monomer unit, and a polymer block comprising a conjugated diene monomer unit, and the block copolymer (b-2) has a polymer block comprising a vinyl aromatic monomer unit, and a polymer block comprising a conjugated diene monomer unit, a content of the block copolymer (b-1) in the total mass of the block copolymer (b) is 5% by mass or more and 40% by mass or less, a content of the block copolymer (b-2) in the total mass of the block copolymer (b) is 60% by mass or more and 95% by mass or less, a number average molecular weight of the block copolymer (b-1) is in the range of 60,000 to 150,000, and a number average molecular weight of the block copolymer (b-2) is 1.5 to 5.0 times higher than the number average molecular weight of the block copolymer (b-1).

8. The asphalt composition according to claim 7, wherein the block copolymer (b-1) has one polymer block comprising a vinyl aromatic monomer unit, and one polymer block comprising a conjugated diene monomer unit, and the block copolymer (b-2) has two or more polymer blocks each comprising a vinyl aromatic monomer unit, and one or more polymer blocks each comprising a conjugated diene monomer unit.

9. The asphalt composition according to claim 1, wherein the block copolymer (a) and/or the block copolymer (b) are block copolymers, in which double bonds in the conjugated diene monomer unit are hydrogenated.

10. The asphalt composition according to claim 1, wherein the block copolymer (a-1) has a polymer block comprising 60% by mass or more of a vinyl aromatic monomer unit, and a polymer block comprising 60% by mass or more of a conjugated diene monomer unit, and the block copolymer (a-2) has a polymer block comprising 60% by mass or more of a vinyl aromatic monomer unit, and a polymer block comprising 60% by mass or more of a conjugated diene monomer unit.

11. The asphalt composition according to claim 1, wherein the block copolymer (a-1) has a polymer block comprising 90% by mass or more of a vinyl aromatic monomer unit, and a polymer block comprising 90% by mass or more of a conjugated diene monomer unit, and the block copolymer (a-2) has a polymer block comprising 90% by mass or more of a vinyl aromatic monomer unit, and a polymer block comprising 90% by mass or more of a conjugated diene monomer unit.

12. A road comprising the asphalt composition according to claim 1 and an aggregate.

13. A road comprising the asphalt composition according to claim 2 and an aggregate.

14. A road comprising the asphalt composition according to claim 3 and an aggregate.

15. A road comprising the asphalt composition according to claim 4 and an aggregate.

16. A road comprising the asphalt composition according to claim 5 and an aggregate.

17. A road comprising the asphalt composition according to claim 6 and an aggregate.

18. A road comprising the asphalt composition according to claim 7 and an aggregate.

19. A road comprising the asphalt composition according to claim 8 and an aggregate.

20. A road comprising the asphalt composition according to claim 9 and an aggregate.

* * * * *